US006725956B1

(12) United States Patent
Lemire

(10) Patent No.: US 6,725,956 B1

(45) Date of Patent: Apr. 27, 2004

(54) FIFTH WHEEL FOR BED

(75) Inventor: Guy Lemire, Beaumont (CA)

(73) Assignee: Stryker Corporation, Kalamazoo, MI (US)

(*) Notice: Subject to any disclaimer, the term of this patent is extended or adjusted under 35 U.S.C. 154(b) by 0 days.

(21) Appl. No.: 10/430,565

(22) Filed: May 6, 2003

(51) Int. Cl.[7] .................................................. B60K 1/00

(52) U.S. Cl. ............................ 180/15; 180/22; 180/209

(58) Field of Search ............................... 180/11, 12, 13, 180/15, 22, 24.02, 65.5, 209

(56) References Cited

U.S. PATENT DOCUMENTS 2,644,540 A * 7/1953 Balzer ........................ 180/211
3,316,993 A * 5/1967 Weitzner .................... 180/208
4,475,611 A * 10/1984 Fisher ........................ 180/6.5
5,222,567 A * 6/1993 Broadhead et al. ........... 180/15
6,000,486 A * 12/1999 Romick et al. ............... 180/23
2002/0043411 A1 * 4/2002 Heimbrock et al. ....... 180/65.5
2002/0088055 A1 7/2002 Vogel et al.

* cited by examiner

*Primary Examiner*—Kevin Hurley
(74) *Attorney, Agent, or Firm*—Flynn, Thiel, Boutell & Tanis, P.C.

(57) ABSTRACT

A fifth wheel support assembly having a frame with plural floor engaging wheels mounted thereon. A housing configured for movement relative to the frame is provided as is a spring mechanism oriented between the frame and the housing so as to continually urge the housing toward the floor. An auxiliary wheel is mounted for rotation on an axle secured to the housing. A drive motor mechanism is provided and is fastened between the frame and the housing to effect a raising and a lowering of the housing and the auxiliary wheel mounted thereon.

11 Claims, 4 Drawing Sheets

ZOOM UP ISO
10
11
12
13
14
16
17
18
19
21
22
26
27
28
29
31
32
33
34
37
38
43
44
46
51
52
53
54
56
57
62
63

FIFTH WHEEL FOR BED

FIELD OF THE INVENTION

This invention relates to a fifth wheel support assembly and, more particularly, to a fifth wheel support for use on a plural wheel supported patient support.

BACKGROUND OF THE INVENTION

In a hospital environment, it is oftentimes desired to provide a motorized driving of a patient support, namely, a bed, from one location to another. Since a patient support is usually supported on four castered wheels, a fifth drive wheel is usually provided to facilitate the aforesaid driving movement. The fifth drive wheel is generally provided at some location within a polygon defined by the regions whereat the four castered wheels engage a floor surface. In addition, the motor that effects the driving of the auxiliary fifth wheel is usually battery powered and a rechargeable battery is generally provided onboard the patient support to provide the power to the motor. In addition, there is generally provided an attendant controlled switch for activating and deactivating the motor. In some instances, the motor is a reversible motor and the switch is provided to accommodate a driving of the motor in opposite directions. However, the structure in known fifth wheel driving arrangements for deploying and retracting the fifth wheel is generally complicated, particularly in relation to the feature that causes the auxiliary fifth wheel to remain in engagement with the floor in instances where the region of contact of the auxiliary fifth wheel with the floor is oriented in a plane generally below the plane containing the regions whereat each of the remaining wheels of the patient support engage the floor.

Accordingly, it is an object of this invention to provide a fifth wheel support assembly which is configured to facilitate a movement of a fifth wheel to a retracted position oriented above the floor surface as well as a movement urged by a spring mechanism into engagement with the floor and with sufficient force to accommodate undulations in the floor surface and maintaining the requisite frictional contact with the floor to provide a continued and smooth driving of the patient support along the floor surface.

It is a further object of the invention to provide a fifth wheel support assembly as aforesaid which has a lost motion connection between the wheel support assembly and the bed frame for effecting a raising and lowering of the auxiliary fifth wheel so that the lost motion connection can accommodate undulations in the floor surface.

It is a further object of the invention to provide an inexpensive support structure, as aforesaid, which is easy to assemble, easy to service and durable in operation.

SUMMARY OF THE INVENTION

The objects and purposes of the invention are met by providing a fifth wheel support assembly having a frame with plural floor engaging wheels mounted thereon. A housing configured for movement relative to the frame is provided as is a spring mechanism oriented between the frame and the housing so as to continually urge the housing toward the floor. An auxiliary wheel is mounted for rotation on an axle secured to the housing, a peripheral surface of the wheel normally engaging the floor in response to the spring mechanism urging the housing toward the floor. A drive motor mechanism is provided and is fastened either to the frame or to the housing. The drive motor mechanism has an elongate driven member that is retractable and extendable. A distal end of the driven member is fastened to the other of the frame and the housing by a fastening mechanism. The fastening mechanism includes a pin. The elongate driven member has an elongate track thereon and which is movable therewith and which guidingly receives thereon the pin. The elongate track has a stop configured to engage the pin in response to the elongate driven member being retracted to effect a movement of the housing away from the floor against the urging of the spring mechanism and, consequently, to cause a corresponding movement of the peripheral surface of the auxiliary wheel away from the floor.

BRIEF DESCRIPTION OF THE DRAWINGS

Other objects and purposes of this invention will be apparent to persons acquainted with apparatus of this general type upon reading the following specification and inspecting the accompanying drawings, in which.

DETAILED DESCRIPTION

Figure 1:
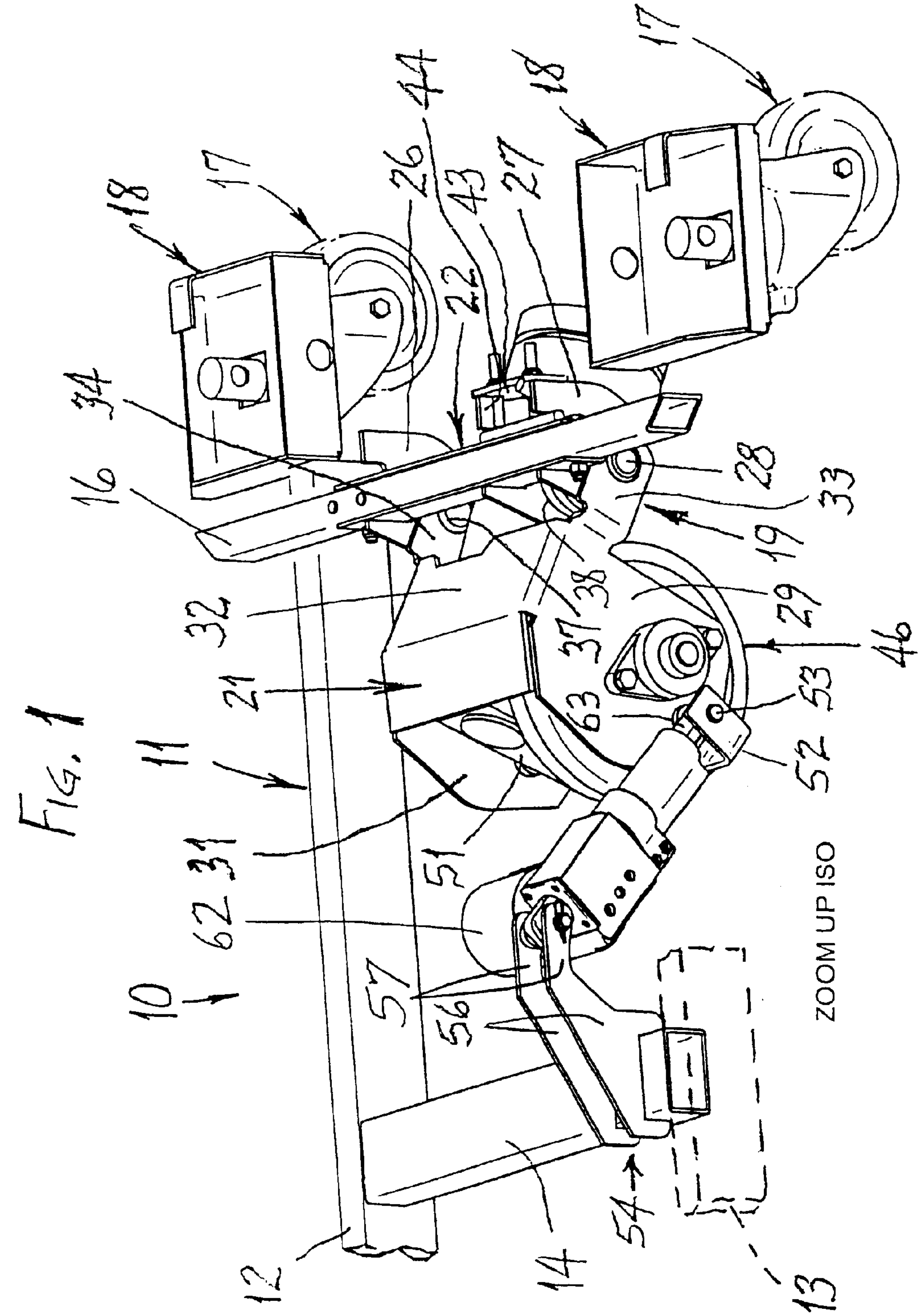
FIG. 1 is an isometric view of a fifth wheel support assembly embodying the invention.

FIG. 1 illustrates a fifth wheel support assembly 10 mounted on a frame 11 composed of a pair of side frame rails 12 and 13 and at least a pair of secondary rails 14 and 16 connected to and extending between the side frame rails 12 and 13. The frame 11 has mounted thereon a plurality of castered wheels 17. In this particular embodiment, the fifth wheel support assembly,is provided on a patient support which generally has four castered wheels 17 oriented at the four corners of the bed. Only two of the castered wheels 17 are illustrated in the drawings, it being understood that the fifth wheel support assembly 10 is oriented between the head end and foot end of the bed and between the secondary rails 14 and 16 as well as between frame rails 12 and 13. The castered wheels 17 are each connected by means of a support bracket 18 secured in a conventional manner to the frame 11.

Figure 2:
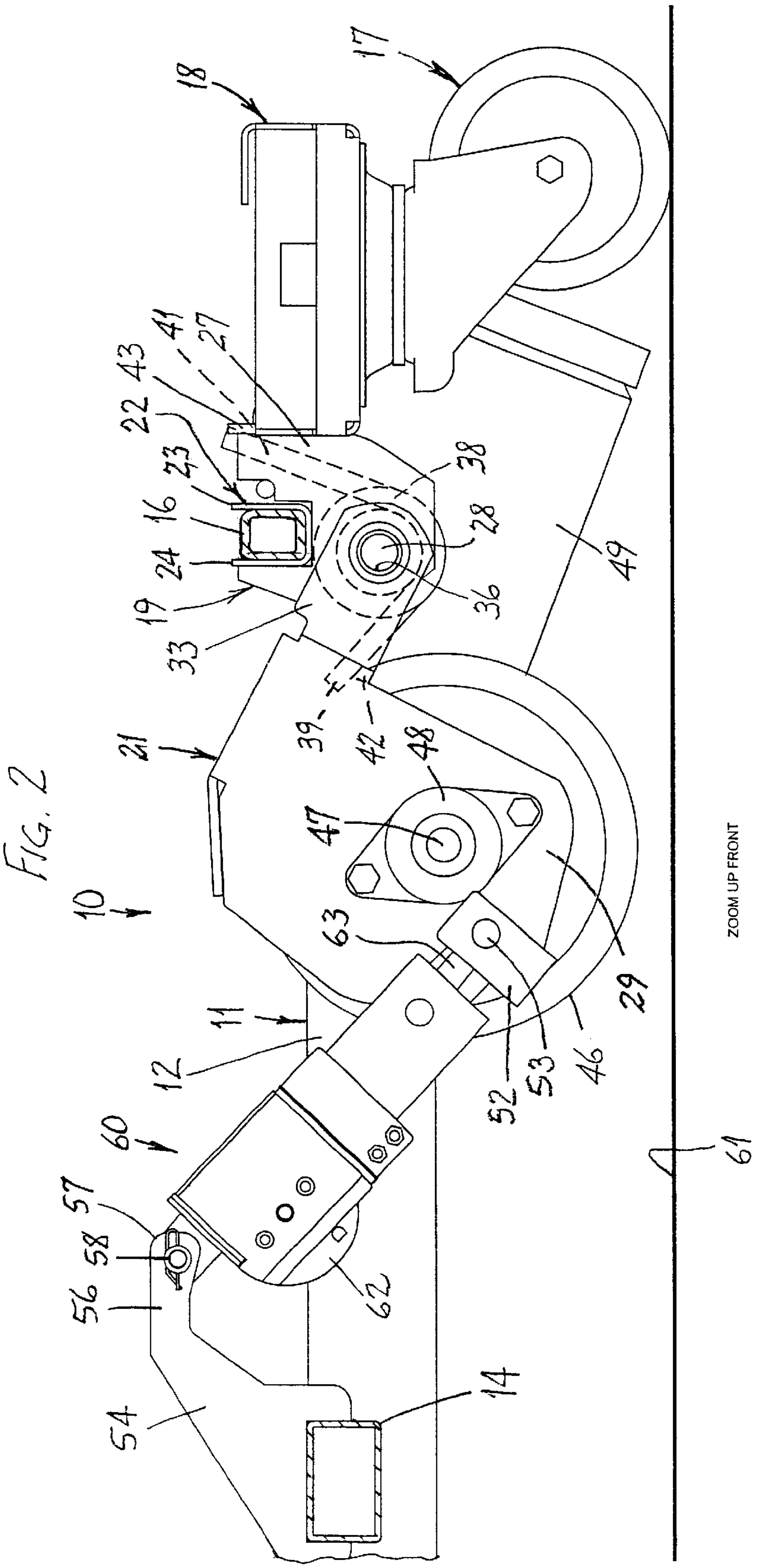
FIG. 2 is a side elevational view of the fifth wheel support assembly, the fifth wheel being in a raised position above the floor surface.

A mounting mechanism 19 is provided for mounting a housing 21 to the secondary rail 16. The mounting mechanism 19 includes a U-shaped bracket 22 having parallel legs 23 and 24 which straddle the secondary rail 16 as illustrated in FIG. 2. The U-shaped bracket 22 is secured to the secondary rail 16 by a plurality of fasteners (not illustrated). A pair of support brackets 26 and 27 are laterally spaced along the length of the U-shaped bracket 22 and are fixedly secured to the U-shaped bracket 22. The brackets 26 and 27 also include an axle 28 extending therebetween. In this particular embodiment, the axle 28 is oriented below the U-shaped bracket 22.

The housing 21 is generally of an inverted U shape having a pair of parallel side flanges 29 and 31 each oriented in a plane parallel to a longitudinal axis of the frame 11. The upper edge of the side flanges 29 and 31 are interconnected by a top wall member 32. An ear 33 extends rearwardly from the side flange 29 and an ear 34 that is horizontally aligned with the ear 33 extends rearwardly from the side flange 31. The ears 33 and 34 each have an opening 36 and 37, respectively, for receiving therein the axle 28. Each of the ears 33 and 34 are oriented side-by-side with the support brackets 26 and 27, the aforesaid components extending in a plane generally parallel to the longitudinal axis of the frame 11. A torsion spring 38 having oppositely extending legs 39 and 41 encircles the axle 28 adjacent the support bracket 27 with one leg 39 of the spring bearing on a flange 42 provided on the side flange 29 and with the other leg 41 bearing against a plate 43 secured to the support bracket 27. The state of the spring in FIG. 2 is tensioned and is configured to continually urge the housing 21 counterclockwise about the axis of the axle 28. If desired, an additional support bracket 44 can be provided intermediate the support brackets 26 and 27 to facilitate a support of the plate 43 at two locations and to control and maintain the torsion spring 38 therebetween.

An auxiliary fifth wheel 46 is mounted for rotation about an axle 47 rotatably secured by a bearing mechanism 48 mounted on the side flange 29 and by a corresponding bearing mechanism (not illustrated) mounted on the side flange 31.

The housing 21 additionally includes a reversible drive motor mechanism 49 and a right angle transmission mechanism 51 configured to connect the output of the motor 49 to the axle 47, which axle 47 is fixedly secured to the auxiliary wheel 46. As a result, when the motor 49 is activated, the output thereof will effect, through the right angle drive transmission 51, a driving of the axle 47 for rotation and a corresponding rotation of the auxiliary fifth wheel 46. The motor and the right angle drive transmission 51 are fixedly secured to the housing by fasteners (not illustrated).

In this particular embodiment, the side flange 29 of the housing 21 includes a bracket 52 supporting a pin 53 oriented on an axis that is parallel to an axis of the axle 47.

A bracket 54 is secured to the secondary rail 14 and includes a pair of parallel extending plates 56 projecting upstandingly away from the secondary rail 14. An end 57 of each of the plates 56 remote from the secondary rail 14 includes a hole 58 therethrough, which holes are axially aligned with each other. If desired, crosswise extending members (not illustrated) can be provided between the plates 56 in order to rigidify the bracket structure.

Figure 3:
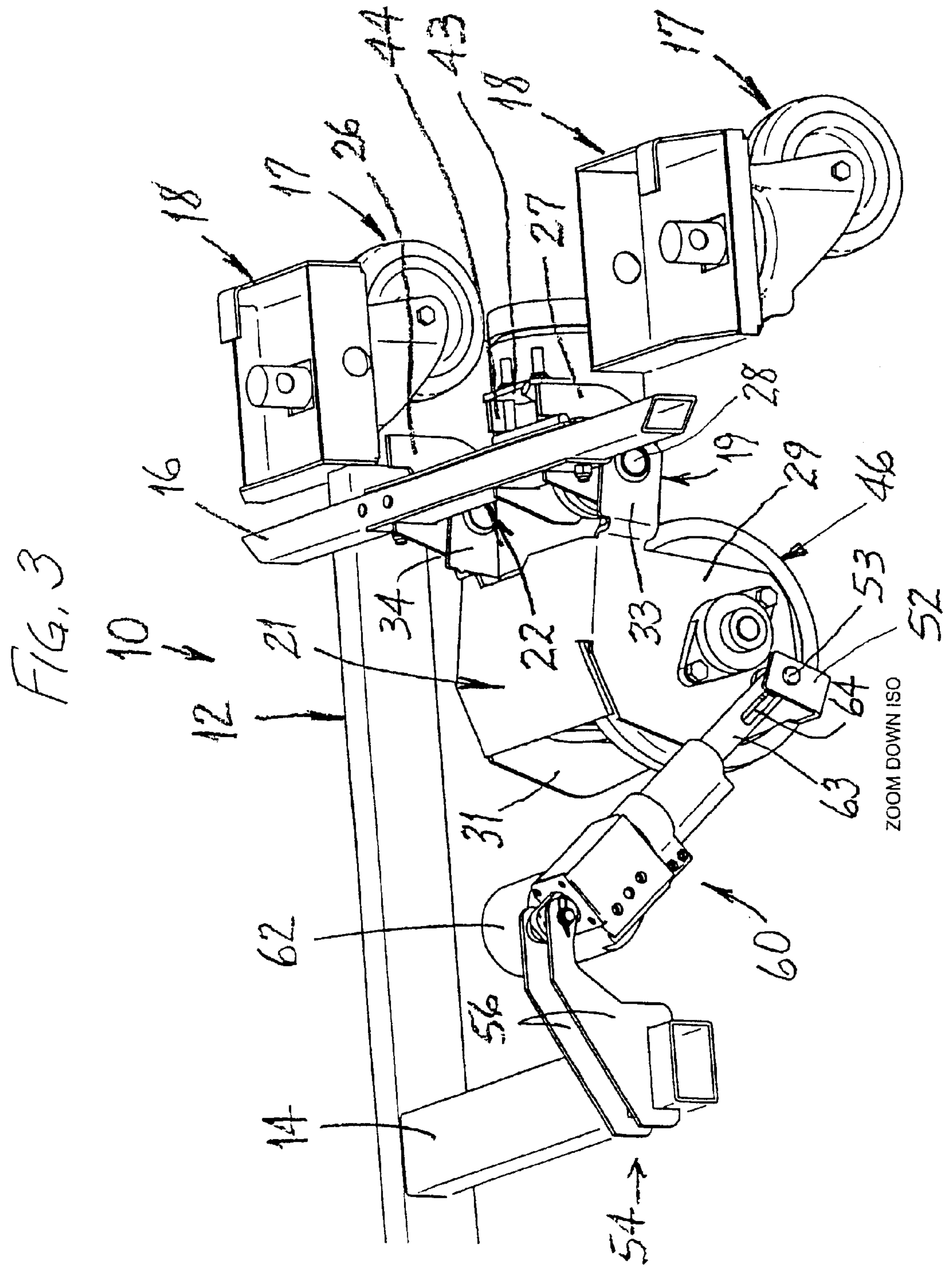
FIG. 3 is an isometric view similar to FIG. 1 except that the auxiliary wheel has been shifted to a lowered position.
Figure 4:
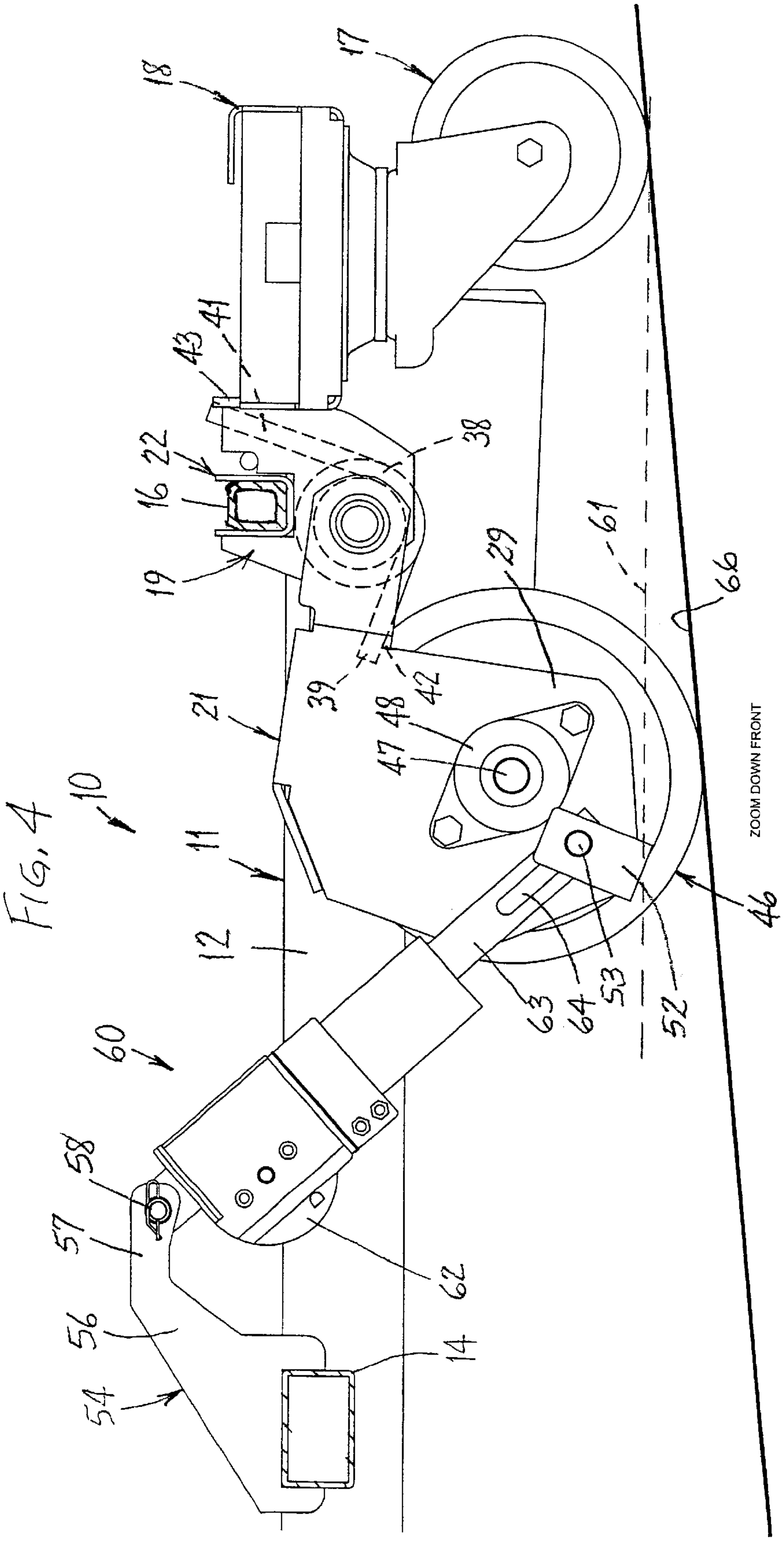
FIG. 4 is a side elevational view of the fifth wheel assembly with the auxiliary wheel being illustrated in contact with a region of the floor surface that is below a plane containing the regions of contact of the plural floor engaging wheels with the floor surface.

A drive motor mechanism 60 is connected at one end to the bracket 54 and at the other end to the pin 53. More specifically, the drive motor mechanism 60 is configured to extend and retract to effect a driving of the housing 51 about the axis of the axle 28 to cause the peripheral surface of the wheel 46 to be moved toward and away from, respectively, the upwardly facing surface of a floor 61. In this particular embodiment, the drive motor mechanism 60 includes a reversible motor 62 having a rotatable output shaft which, upon being rotated, effects an extension and a retraction of a driven member 63. The rotatable output of the motor 62 can be converted into a reciprocal motion of the driven member 63 by conventional means well known in the art. In this particular embodiment, the driven member 63 has an elongate slot 64 (FIG. 3) in which is received the pin 53. The elongate slot 64 extends lengthwise of the driven member 63. When the driven member 63 is moved to the retracted position illustrated in FIG. 2, the end of the elongate slot 63 remote from the drive motor 62 is engaged with the pin 53 so as to draw the housing 21 in a clockwise manner about the axis of the axle 28 and against the urging of the torsion spring 38. Upon operation of the motor 62 to effect an extension of the driven member 63 to the fully extended position illustrated in FIG. 4, the pin 53 would be oriented mid-length of the slot 64 when the peripheral surface of the auxiliary wheel 46 is engaged with the floor surface 61. As illustrated in FIG. 4, when the location whereat the auxiliary wheel 46 engages a floor surface 66 which is below the floor surface 61 upon which the castered wheels 17 are supported, the torsion spring 38 will effect a counterclockwise movement of the housing 21 to maintain an engagement of the peripheral surface of the auxiliary wheel with the floor surface 66 and with sufficient force so as to permit the auxiliary wheel 46 to maintain a driving movement of the wheel supported frame 11.

It is to be recognized that the drive motor mechanism 60 could be connected in a reverse manner to that illustrated in FIGS. 2 and 4. That is, the driven member 63 could be connected to the pin extending through the opening 53 in the plates 56 and the other end secured to the bracket 52 by means of the pin 53.

It is to be also recognized that the drive motor mechanism 60 can be a drive motor 62 having a rotatable output shaft rotatable in a single direction of rotation. In this case, the output shaft of the drive motor 62, when rotated, would rotatably drive an elongate double flighted screw shaft on which would be provided the driven member, here a traveling nut also having a double flighted internal screw thread operatively connected to the threads on the screw shaft. The traveling nut has an elongate slot therein, comparable to the slot 64, which slot receives the pin 53 therein as described above. Upon the nut reaching an end of travel in both lengthwise directions along the length of the screw shaft, a continued rotation of the screw shaft will effect an automatic crossover of the operatively mated threads to cause a movement of the nut (driven member 63) in the opposite directions.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A fifth wheel support assembly, comprising:

a frame having plural floor engaging wheels mounted thereon;

a housing configured for movement relative to said frame toward and away from the floor;

a resilient mechanism oriented between said frame and said housing and configured to continually urge said housing toward the floor;

a wheel mounted for rotation on an axle secured to said housing, a peripheral surface of said wheel normally engaging the floor in response to said spring mechanism urging said housing toward the floor;

a drive motor mechanism fastened to at least one of said frame and said housing and having a driven member that is retractable and extendable relative to said drive motor mechanism, said driven member being fastened to the other of said at least one of said housing and said frame by a fastening mechanism, said fastening mechanism including a pin having an axis that extends parallel to an axis of said axle, said driven member having an elongate slot slidably receiving therein said pin, said pin and said slot being configured to cause said pin to engage one end of said elongate slot in response to said driven member being retracted to effect a movement of said housing away from the floor against the urging of said spring mechanism and, consequently, a corresponding movement of said peripheral surface of said wheel away from the floor.

2. The fifth wheel support assembly according to claim 1, wherein said pin and said slot are additionally configured to cause said pin to reside in and at a mid-length position of said elongate slot in response to said driven member being fully extended and said peripheral surface of said wheel at a location whereat said peripheral surface contacts the floor is coplanar with a plane containing the locations whereat each of said plural floor engaging wheels contacts the floor.

3. The fifth wheel support assembly according to claim 1, wherein said drive motor mechanism includes a manually engageable switch.

4. The fifth wheel support assembly according to claim 1, wherein said housing includes a motor having a rotatable output shaft, said axle being directly connected to said output shaft.

5. A fifth wheel support assembly for a plural wheel supported patient support, comprising:

a frame having said plural wheels mounted thereon, said frame having a head end and a foot end and a pair of elongate side frame rails extending between said head end and said foot end, said frame additionally having at least a pair of secondary rails connected to and extending between said elongate frame rails at spaced locations between said head end and said foot end;

a housing pivotally mounted to said frame and for movement about a first axis to facilitate a movement of said housing toward and away from a floor surface engaged by said plural wheels;

a spring mechanism oriented between said frame and said housing and configured to continually urge said housing toward the floor;

an auxiliary wheel mounted for rotation on said housing on an axle secured to said housing, a peripheral surface of said wheel normally engaging the floor in response to said spring mechanism urging said housing toward the floor;

a drive motor mechanism fastened to at least one of said frame and said housing and having an elongate driven member that is retractable and extendable relative to said drive motor mechanism, a distal end of said driven member being fastened to the other of said at least one of said housing and said frame by a fastening mechanism, said fastening mechanism including a pin having a second axis that extends parallel to said first axis, said elongate driven member having an elongate track thereon and movable therewith guidingly receiving thereon said pin, said elongate track having a stop thereon configured to engage said pin in response to said elongate driven member being retracted to effect a movement of said housing away from the floor against the urging of said spring mechanism and, consequently, a corresponding movement of said peripheral surface of said auxiliary wheel away from the floor.

6. The fifth wheel support assembly according to claim 5, wherein said housing is pivotally mounted to a first one of said secondary rails and wherein said first axis is generally perpendicular to a longitudinal axis between said head end and said foot end.

7. The fifth wheel support assembly according to claim 5, wherein said drive motor mechanism is fastened to a first one of said secondary rails; and wherein said fastening mechanism is secured to said housing and being movable therewith.

8. The fifth wheel support assembly according to claim 5, wherein said first axis, said second axis and an axis of said axle are parallel to each other.

9. The fifth wheel support assembly according to claim 5, wherein said drive motor mechanism is fastened to a second one of said secondary rails; and wherein said fastening mechanism is secured to said housing and being movable therewith.

10. The fifth wheel support assembly according to claim 9, wherein said first axis, said second axis and an axis of said axle are parallel to each other.

11. The fifth wheel support assembly according to claim 10, wherein said housing includes a motor having a rotatable output shaft, said axle being directly connected to said output shaft.

* * * * *